United States Patent Office.

PROSPER VINCENT RAMEL, OF PARIS, FRANCE.

Letters Patent No. 97,962, dated December 14, 1869.

IMPROVED PROCESS OF PREPARING PLANTS TO BE USED IN CIGARS, SNUFF, &c.

The Schedule referred to in these Letters Patent and making part of the same.

*To all whom it may concern:*

Be it known that I, PROSPER VINCENT RAMEL, of Paris, in the Empire of France, have invented a new and useful Method of Preparing Plants of the Eucalyptus family and Myrtacean plants, and the application thereof to the Purposes of Tobacco and Snuff; and declare the following to be a true and exact description of the same; that is to say—

My invention consists in the utilization of the leaves of plants of the eucalyptus family, and of myrtles generally, and in the application of these leaves to the purposes for which tobacco and snuff are now used.

These leaves do not possess the injurious properties of tobacco, the vegetable elements of which they consist, on the contrary, being inoffensive.

The juice that emanates therefrom is agreeable both to the palate and to the smell.

The ashes produced by the combustion of these plants have no corrosive or astringent action, and do not injuriously affect the mucous membrane of the palate, the gums, or the enamel of the teeth. The scented smoke that arises from them does not contain any intoxicating vapors, it has not the sharpness of those of tobacco, and whether inhaled or exhaled, it has a beneficial and agreeable effect.

Among the eucalypti, I mention the scented eucalypti, the globular eucalyptus, the *Eucalyptus amygdalimus*, &c.; I also employ the leaves of myrtles in general.

I proceed in the following manner:

First, I dry the leaves of the plant in the shade.

Second, I bleach them by the application of hot water or steam.

Third, I dry them either in the air or on a stove, and submit them, before their complete desiccation, to a pressure that crushes the fibres of each leaf, so as to obtain a softer and more uniform surface, and therefore a more regular combustion. This crushing of the fibres may be produced by passing the leaves between cylinders, plates, or other pressing-media, and thus allow the said fibres to be utilized, and avoid a great waste of time and material. If desirable, the fibres can be cut out with scissors, and used for the heart of the cigar, and this operation should always take place with those leaves that are intended for the outside of the cigar.

Fourth, I place the leaves thus prepared in an envelope or cover, and roll the whole, (which constitutes the centre of the cigar,) in the larger leaves.

Fifth, I secure one of the ends of the cigar with a strip of the fibre of the eucalyptus or other plant, either with gum or other adhesive substance.

The cigars thus manufactured have a slightly conical form, resembling a manilla, and possess the most favorable conditions for use.

I may occasionally mix with these products, (cigars or otherwise,) a small quantity of tobacco, and use as an envelope either maize-leaves or paper.

As for the compounds called snuffs and scaferlati, whether in rolls or slabs, for smoking or chewing, the leaves of eucalyptus, after their above-described preliminary preparation, undergo special operations applicable to each separate kind of article.

I claim, as my invention—

The new application of the leaves of the eucalyptus and of the family of myrtles, and their treatment above described, to all the purposes for which tobacco has been hitherto used, and for tobaccos in roll or in slabs, and for snuffs. After having submitted the leaves of the eucalyptus to the preparatory processes above described, they are treated in the same way as the leaves of the tobacco-plant are now treated for the various purposes for which they are intended.

In testimony whereof, I have signed my name to this specification, before two subscribing witnesses.

P. V. RAMEL.

Witnesses:
  C. LAFOND,
  F. OLCOTT.